(12) United States Patent
Smith

(10) Patent No.: US 6,871,883 B2
(45) Date of Patent: Mar. 29, 2005

(54) FLUID LINE LOCKING STRUCTURE

(75) Inventor: Ellis Junior Smith, Martinez, GA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/372,752

(22) Filed: Feb. 21, 2003

(65) Prior Publication Data

US 2004/0164553 A1 Aug. 26, 2004

(51) Int. Cl.$^7$ ............................................. F16L 17/00
(52) U.S. Cl. ......................................... 285/376; 285/401
(58) Field of Search ................................ 285/376, 401, 285/360, 361; 210/441

(56) References Cited

U.S. PATENT DOCUMENTS

| | | | | |
|---|---|---|---|---|
| 99,744 A | * | 2/1870 | Alford et al. ............... | 285/361 |
| 178,245 A | * | 6/1876 | Lickiss ....................... | 285/376 |
| 732,487 A | * | 6/1903 | Wischermann et al. ..... | 285/360 |
| 765,225 A | * | 7/1904 | Colin .......................... | 285/376 |
| 1,193,162 A | * | 8/1916 | Lewis ......................... | 285/376 |
| 1,195,433 A | * | 8/1916 | Bailey ........................ | 285/360 |
| 1,221,935 A | * | 4/1917 | White ......................... | 285/376 |
| 1,881,508 A | * | 10/1932 | Gredell ....................... | 285/376 |
| 2,290,403 A | * | 7/1942 | Wyss .......................... | 285/376 |
| 2,408,243 A | * | 9/1946 | Vartanian .................... | 285/360 |
| 2,684,860 A | * | 7/1954 | Rafferty ..................... | 285/376 |
| 6,170,882 B1 | * | 1/2001 | Prest .......................... | 285/360 |
| 6,648,377 B2 | * | 11/2003 | Marandi ..................... | 285/376 |
| 6,730,218 B2 | * | 5/2004 | Bozenmayer ............... | 285/361 |

OTHER PUBLICATIONS

Deere & Company, 4510 Compact Utility Tractor Parts Catalog, p. H16, publication date—Dec. 18, 2001, published in U.S.A.

* cited by examiner

Primary Examiner—David Bochna

(57) ABSTRACT

A simple twist and lock or unlock structure is provided for use with high pressure hydraulic lines used on small vehicles such as Lawn and Garden tractors. The locking structure utilizes the combination of a tab and slotted member secured to adjacent end portions of the hydraulic lines to releasably secure them together. No tools are required to rotatably manipulate the locking structure into its locked or unlocked position. With this structure, no clamping hardware is needed to secure the lines together nor are any anchoring brackets required to mount the lines to the vehicle or its components. Accordingly, leaks caused by engine vibrations or vehicle encounters with small obstacles are minimized.

4 Claims, 2 Drawing Sheets

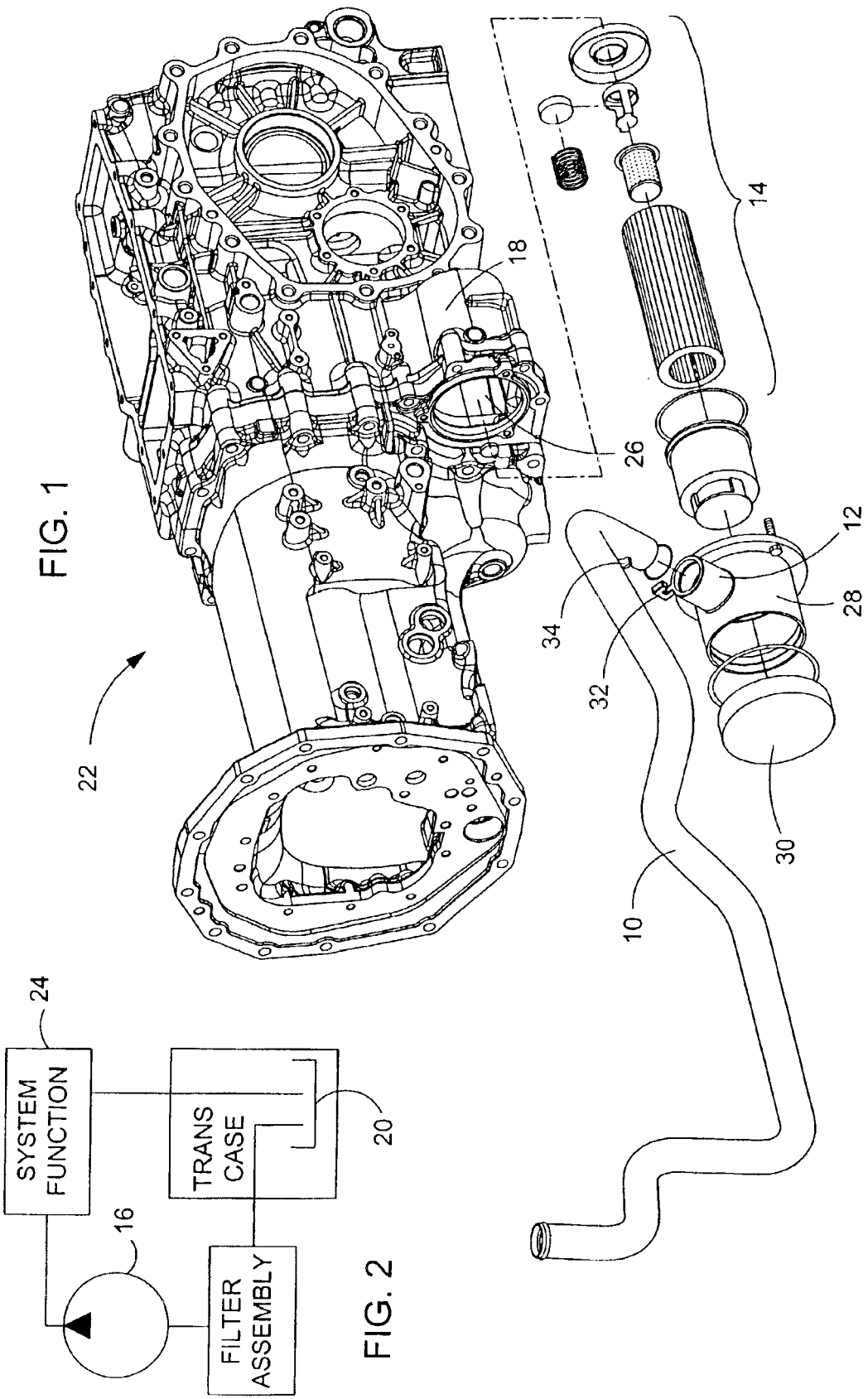

FLUID LINE LOCKING STRUCTURE

CROSS REFERENCE TO RELATED APPLICATIONS

1. Field of the Invention

The present invention relates to hydraulic systems for small tractors such as lawn and garden tractors and more specifically to a locking structure that permits adjacent end portions of hydraulic lines in such systems to be quickly and easily coupled or uncoupled.

2. Background of the Invention

Small vehicles such as lawn and garden tractors are commonly provided with hydraulic systems that operate hydrostatic transmissions, clutches, brakes, steering components and various attachments. The hydraulic fluid lines and their connectors, which are in part carried in the lower areas of the vehicle and engine compartment, are exposed to a hostile environment including impacts from stumps, tree limbs and other objects over which the vehicle passes. For these reasons as well as because the hydraulic fluid in these systems is under substantial pressure, the lines within which the fluid is contained are either high strength hoses or steel.

Generally, several segments of hydraulic lines are coupled together to form the hydraulic circuitry comprising the vehicles hydraulic system. To couple the ends of the hydraulic lines together, o-rings are used and clamps then secure the adjacent end portions together. Additional clamps are provided to anchor the clamped end portions as well as the lines or tubes to the vehicle frame or adjacent vehicle components so that the coupled fittings or joints do not leak due to vibrations or impacts.

Frequently though, there are no convenient support points adjacent to the lines to which anchoring clamps can be secured. Even when there are reasonably convenient anchor points available, the engine vibrations and/or impacts of the tubes or mounting hardware with obstacles can cause the joints and/or fittings to break, loosen and/or leak.

For these reasons, it would be desirable to provide a means for coupling the joints and/or fittings of hydraulic line segments together which doesn't rely upon clamps or the nearness of adjacent vehicle anchor points, doesn't require anchoring hardware and will not tend to loosen when vibrations occur and/or the lines encounter obstacles.

SUMMARY OF THE INVENTION

Towards these ends there is provided a fastening means which can be used between a hydraulic line or tube and the flange of the line within which it is received that requires no separate hardware, requires no adjacent anchoring points on the vehicle structure and tends to maintain the leak proof integrity of the joints as vibrations and/or impacts occur.

More specifically, there is provided a locking structure for securing the end portion of a hydraulic line to the end portion of an adjoining hydraulic line. It includes a slotted member welded or otherwise attached to the outer surface of one hydraulic line or tube for engagement with a tab fixed to the other line or tube. The tab is rotatably and releasably engageable with the slotted member to couple or release the adjoining lines. An o-ring is provided at the interface of the lines to seal them. The locking structure eliminates the need for separate hardware and adjoining anchor points. It can easily be engaged or disengaged without the need for tools and is able to maintain the leak proof integrity of the line joints as vibrations and impacts are encountered.

BRIEF DESCRIPTION OF THE DRAWINGS

FIG. 1 illustrates a transmission case and an exploded view of an hydraulic oil filter assembly with which the line locking structure could be used.

FIG. 2 is a schematic illustration of an hydraulic fluid system which could utilize the line locking structure.

DESCRIPTION OF THE PREFERRED EMBODIMENT

Figure 5:
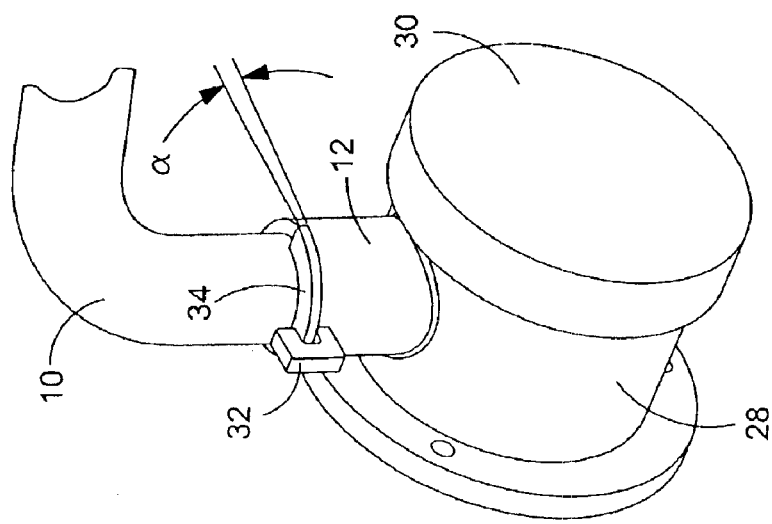
FIG. 5 illustrates the lines in their engaged and locked position.

In the preferred embodiment illustrated, the locking structure connects or couples two hydraulic fluid lines 10 and 12 used in a small vehicle such as a lawn and garden tractor. As illustrated in FIG. 1, the locking structure joins the line 10 that draw fluid from the oil filter assembly 14, which is shown in an exploded fashion, to the pump 16. It is contemplated that the locking structure could be used to secure other line segments together as well. The oil filter assembly 16 illustrated in FIG. 1 is designed to be mounted within a housing 18 provided in the oil reservoir 20 of the transmission case 22 of the vehicle. A complete explanation and discussion of this oil filter assembly 16 and its application will be found in applicant's related patent applications mentioned hereinabove.

As schematically illustrated in FIG. 2, the pump 16 serves to move hydraulic fluid to various hydraulic system functions 24 such as the brakes, steering, attachments and then to the fluid reservoir 20, which in the present embodiment is in the transmission case 22. From there, the pump 16 draws the fluid through the oil filter assembly 14, suction line 10 and back.

Looking again to FIG. 1, it will be seen that one end portion of the filter assembly 14 is received in an opening 26 of the transmission case 22 and mounted within the housing 18 provided in that case 22 with the other end portion being supported in a cantilevered fashion by the cast filter head 28. This cast head 28 is provided with a threaded end cap 30 that permits the oil filter assembly 14 to be easily installed and removed.

Coupled with the oil outlet tube 12 provided in the cast head 28 is the suction line or tube 10 which moves hydraulic fluid under vacuum to the pump 16. In the preferred embodiment the hydraulic lines 10 and 12 are comprised of flexible hoses, but could also be comprised of metal tubing.

Figure 4:
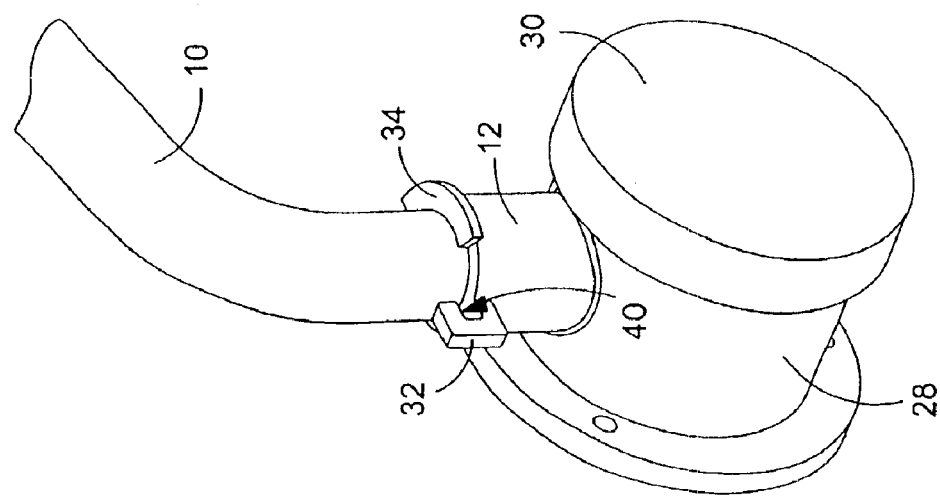
FIG. 4 illustrates the lines in an engaged but unlocked position.
Figure 3:
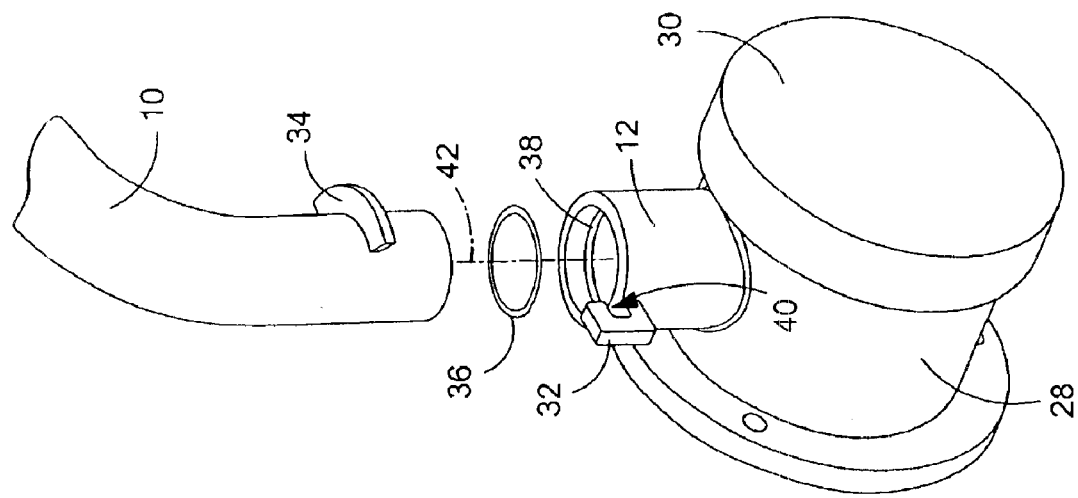
FIG. 3 illustrates two hydraulic fluid lines with the locking structure in an uncoupled position.

Looking now to FIGS. 3 through 5, there is illustrated in greater detail the locking structure which serves to secure the suction line 10 with the outlet line 12 provided in the cast head 28. This structure includes a slotted member 32 carried on the outer surface of the outlet tube 12 and a tab 34 secured to the outer surface of the suction tube 10. In the preferred embodiment, the slotted member 32 and tab 34 are both welded to their respective lines 12 and 10. It is to be understood that the locations of the slotted member 32 and tab 34 could be reversed.

Looking again to FIG. 3 where the two lines 10 and 12 are illustrated in their disengaged positions, it can be seen that an o-ring 36 is provided on a ledge 38 which is formed within the outlet line 12. This o-ring 36 assists in sealing the joint between the lines 10 and 12 and thereby provides a leak proof seal once the lines 10 and 12 are joined.

FIGS. 4 and 5 next illustrate the sequence of positioning and securing the suction line 10 within the outlet line 12 by rotating it to slide the tab 34 tightly within the slotted opening 40 of the slotted member 32. In the preferred embodiment, the tab 34 is provided with a slight upward angle α at its right side, as viewed in FIGS. 3–5, while the plane occupied by the slotted opening 40 in the slotted member 32 is essentially perpendicular to the axis 42 of the outlet tube 10. In this way, sliding movement of the tab 34 into the slotted member 32 serves to pull the suction line 10 down and into the outlet line 12, compressing the o-ring 36 and locking the lines 10 and 12 together. Alternatively, the tab 34 could be comprised of a material or thickness which permits it to be resilient and therefore be biased into engagement with the edges of the slotted opening 40 as they are engaged.

As is apparent from the drawing figures, no clamps or hardware are required to secure the lines 10 and 12 together. Further, no anchoring hardware or structure is required to support the suction line 10 on the vehicle. With the cast head 28 bolted to and supported by the transmission case 22 and the locking structure securing the outlet and suction lines 10 and 12 together, there is no need for anchor points or line supporting hardware on the transmission case 22, the vehicle or its components. With the present locking structure, coupling or uncoupling of hydraulic fluid line joints is simple, quick and easy with no need for tools.

With the present invention, there is provided a simple, effective hydraulic fluid line locking structure that secures and positively couples the lines together in a leak proof joint, eliminates the need for clamps, hardware and anchor points, reduces the likelihood of damage to the hydraulic lines due to vibration and impacts and simplifies the task of coupling and uncoupling of hydraulic lines and joints.

Having described the preferred embodiment, it will become apparent that various modifications can be made without departing from the scope of the invention as defined in the accompanying claims.

What is claimed is:

1. An apparatus comprising:
   a first hydraulic tube having an outer circumference and a longitudinal axis extending radially from the head of a generally cylindrical filter assembly;
   an internal ledge within the first hydraulic tube;
   a second hydraulic tube having an outer circumference and a first end insertable into the first hydraulic tube to abut the internal ledge; at least the first end of the second hydraulic tube being coaxial with the first hydraulic tube;
   a slotted member extending axially and radially from the outer circumference of the first hydraulic tube; and
   a tab extending at least partially around the outer circumference of the second hydraulic tube adjacent the first end thereof; the tab extending further around the outer circumference of the second hydraulic tube than the slotted member extends around the outer circumference of the first hydraulic tube.

2. The apparatus of claim 1 wherein the tab is at an acute angle α with respect to a plane perpendicular to the longitudinal axis.

3. The apparatus of claim 1 further comprising an o-ring positioned on the ledge.

4. The apparatus of claim 3 wherein the o-ring is compressed by sliding movement of the tab into the slotted member.

* * * * *